United States Patent [19]

Fujii et al.

[11] Patent Number: 5,371,838
[45] Date of Patent: Dec. 6, 1994

[54] DOT PRINTER WITH A REDUCED AVERAGE NUMBER OF DOT-EXPANSION OPERATIONS

[75] Inventors: Kenichi Fujii; Hisashi Uemura; Motoki Matsubara, all of Hyogo, Japan

[73] Assignee: Kanzaki Paper Mfg. Co., Ltd., Tokyo, Japan

[21] Appl. No.: 88,091

[22] Filed: Jun. 22, 1993

Related U.S. Application Data

[63] Continuation of Ser. No. 631,867, Dec. 21, 1990.

[30] Foreign Application Priority Data

Dec. 26, 1989 [JP] Japan .................................. 1-337556
Dec. 26, 1989 [JP] Japan .................................. 1-337557

[51] Int. Cl.$^5$ ............................................. G06F 15/00
[52] U.S. Cl. .................................... 395/116; 395/112
[58] Field of Search ............... 395/101, 110, 112, 115, 395/116, 117, 162–165, 150, 108; 400/61, 62, 65, 70, 76; 358/296, 404, 444, 537–540; 346/154

[56] References Cited

U.S. PATENT DOCUMENTS

| | | | |
|---|---|---|---|
| 4,516,139 | 5/1985 | Takiguchi | 346/75 |
| 4,553,860 | 11/1985 | Imaizumi et al. | |
| 4,780,008 | 10/1988 | Ueno et al. | |
| 4,944,614 | 7/1990 | Tanaka | 400/68 |
| 5,113,491 | 5/1992 | Yamazaki | 395/141 |

FOREIGN PATENT DOCUMENTS 0352498  1/1990  European Pat. Off.
2194488  3/1988  United Kingdom.

Primary Examiner—Arthur G. Evans
Attorney, Agent, or Firm—Cushman, Darby & Cushman

[57] ABSTRACT

This invention relates to a dot printer of the type in which received printing data are converted into dot-patterns to be printed. A printer of this type mainly comprises: a main memory which stores the printing data as either fixed part data and variable part data; a mechanism for identifying the fixed part data and the variable part data; and a buffer or buffers for storing the result of performing an operation, usually called "dot-expansion," on the printing data stored in the main memory. The contents of the buffers are applied to the printing head, which in turn, prints dot-images on a sheet of paper. Because the CPU dot-expands and recopies only the variable part data in the main memory into the buffer, a needless computation associated with dot-expanding fixed-part data is eliminated. In addition, if two buffers are used, a first buffer may hold dot-expanded data while the printing head is operating and while the other buffer is being filled with dot-expanded data, to be printed subsequent to the printing of the contents of the first buffer. Segmenting the main memory into fixed part data and variable part data and two-buffer scheme allow printers of the present invention to print a document faster than conventional dot-printers.

5 Claims, 3 Drawing Sheets

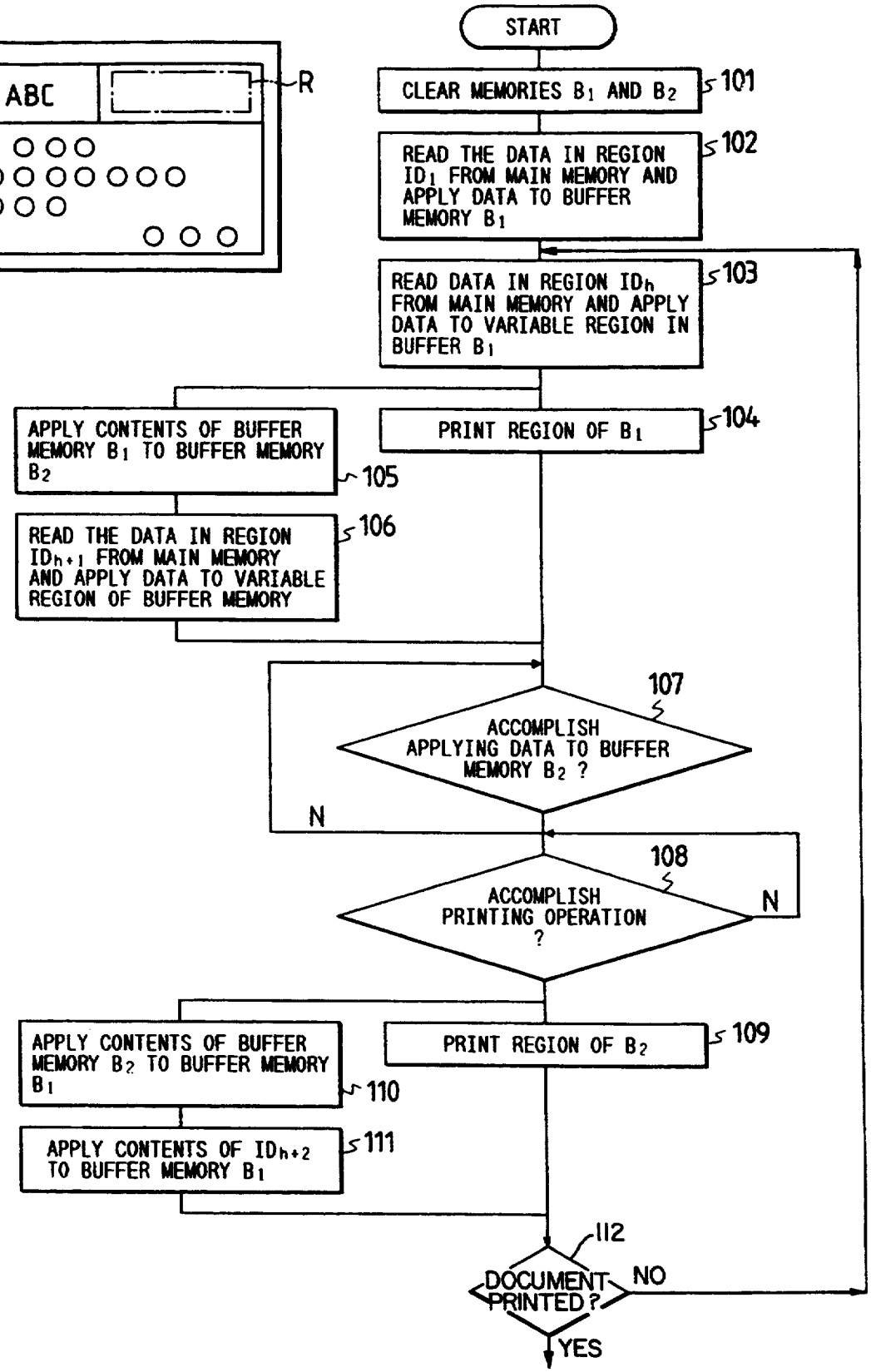

5,371,838

DOT PRINTER WITH A REDUCED AVERAGE NUMBER OF DOT-EXPANSION OPERATIONS

This is a continuation of application Ser. No. 07/631,867, filed on Dec. 21, 1990, which was abandoned upon the filing hereof.

BACKGROUND OF THE INVENTION

This invention relates to a dot printer of the type in which received printing data are converted into dot patterns to be printed.

A printer of this type generally includes a main memory which stores data to be printed. Data is read from the main memory and an operation known as "dot-expansion" is carried out on the data. The data resulting from dot-expansion is then stored in a buffer.

A conventional dot printer successively performs the following operations: (1) reading data from the buffer and driving the printing head to print out several lines; (2) reading data corresponding to several lines from the main memory and performing the dot-expansion on that data; and (3) storing the dot-expanded data in the buffer. Thus, the conventional printer applies a full dot-expansion to the printing data every several lines.

The conventional printer is not efficient because it performs substantially the same operations for each page of the document. For example, there are many documents in which all pages are equivalent in content, except for a few isolated parts. Because each page must be entirely subjected to dot-expansion every several lines, the printer must perform substantially the same operations for each page of the document, thus wasting time.

SUMMARY OF THE INVENTION

Accordingly, an object of this invention is to eliminate the above-described inefficiency of a conventional dot printer.

A first embodiment of a dot printer according to the present invention includes a main memory, first and second buffers, and a control means. The main memory stores printing data as fixed part data and variable part data. The first and second buffers each stores the printing data for one page of a document as dot-pattern data. Each buffer comprises a fixed part data region and a variable data region. The control means causes two operations to be carried out in a manner described below, alternately until a full document is printed. First, it causes the contents of the first buffer to be applied to the printing head, while doing the following: (1) transferring the contents of the first buffer to the second buffer; (2) dot-expanding a group of variable part data (in main memory) into a group of dot-pattern data; and (3) writing the group of dot-pattern data into the variable data region of the second buffer. Second, after the contents of the first buffer has been printed out, the control means applies the contents of the second buffer to the printing head while doing the following: (1) transferring the contents of the second buffer into the first buffer; and (2) writing dot-expanded variable part data into the variable data region of the first buffer.

The second embodiment of the present invention comprises: a main memory for storing printing data as fixed part data and variable part data; means for identifying the fixed part data and the variable part data; a buffer for storing dot-pattern data, the buffer being able to store more than one page of document and comprising a fixed part data region and a variable data region; and a control means for dot-expanding fixed part data from the main memory and transferring its result into the buffer. The control means, whenever one page is printed, reads variable part data from the main memory in order to overwrite the variable data region of the buffer.

BRIEF DESCRIPTION OF THE DRAWINGS

FIG. 4 shows a layout of a printed document;

FIG. 5 is a flow chart for the operation of the first embodiment;

PREFERRED EMBODIMENTS OF THE PRESENT INVENTION

The present invention will now be described in detail with references to the accompanying drawings.

Figure 1A:
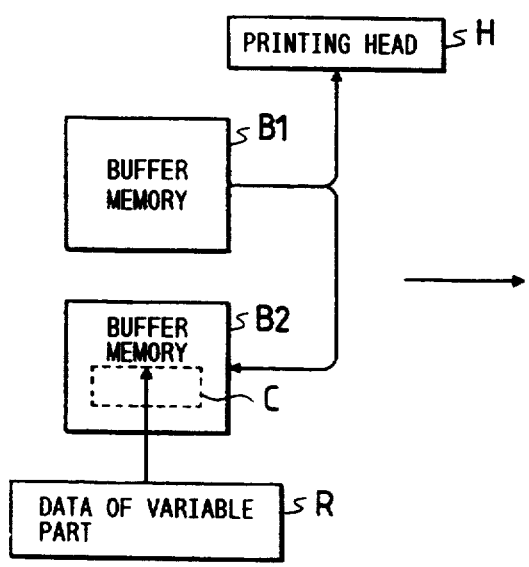
FIG. 1A and 1B show data paths among main components for the first embodiment of the present invention.
Figure 1B:
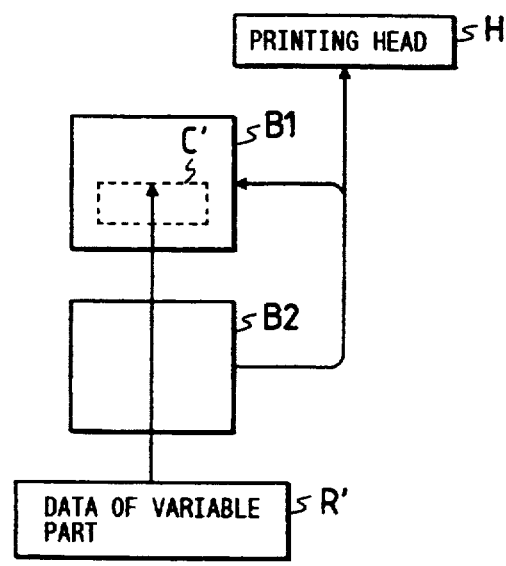
Figure 2:
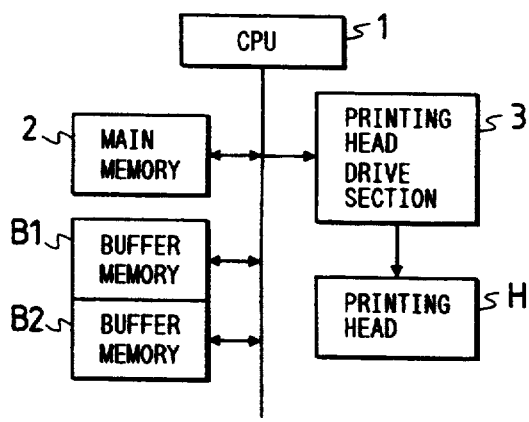
FIG. 2 is a functional block diagram of the first embodiment.

FIG. 2 is a block diagram of a first embodiment of a printer according to the present invention. A CPU 1 controls the printer. A main memory 2 stores printing data. Buffers B1 and B2 each stores dot-pattern data. Each buffer B1 and B2 has a capacity to store more than one page of a document to be printed. A printing head drive section 3 controls the position and actuation of a printing head H.

Figure 3:
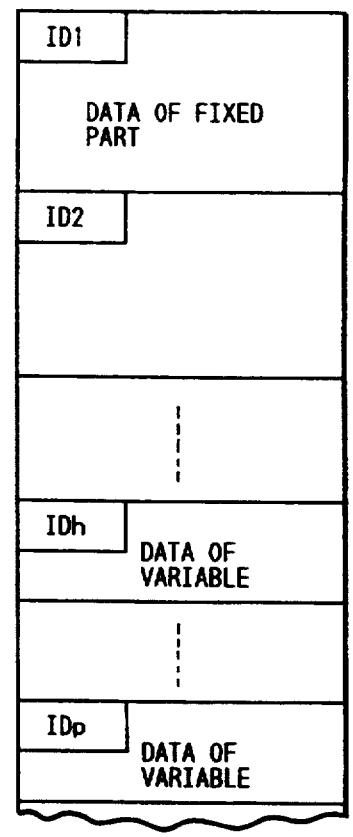
FIG. 3 shows an arrangement of two types of data, fixed part data and variable part data, both residing in the main memory of the first embodiment.

FIG. 3 is a map of the contents of the main memory 2. Document data with ID numbers ID1, ID2 and so forth are stored in the main memory 2. ID1 represents a group of fixed part data for a page of a document, and IDh through IDp represent groups of variable part data of the document. In general, the fixed part data for a document do not change substantially from one page to the next, whereas the variable part data frequently change.

During a printing operation, the CPU 1 executes printing instructions which selects groups of data to be used from the main memory. Each group of data is identified by an ID number.

FIG. 4 shows a page layout of a document to be printed. The portion surrounded by the one-dot chain corresponds to groups of variable part data in the main memory 2. Specifications for the printing position of a group of variable part data are stored within the group of variable part data itself, near the top of the variable part data. The variable part data may be related to spacing between characters, line spacing, and the position of the first character in a page.

FIG. 5 is a flow chart for a printing operation of the dot printer according to the present invention. In the figure, the CPU 1 executes the printing instruction—"Fixed part ID1, variable part IDh through IDp." When the printing operation begins, contents of the buffers B1 and B2 are reset (cleared) (step 101). Also, the fixed part data ID1 is read from the main memory 2 and transferred to the buffer B1 after being dot-expanded (step 102). Next, data in the region IDh is read and inputted into a variable data region in the buffer B1 after being dot-expanded (step 103). Subsequently, the contents of the buffer B1 are read, applied to the printing head drive section 3 (step 104), and transferred to the buffer B2 (step 105). While step 104 is being executed, data in the region IDh+1 is read, dot-expanded, and inputted into the variable data region of the buffer B2 (step 106). Upon completion of the steps 104 through 108, the printing operation for the second sheet begins; that is, contents of the buffer B2 are successively read out and applied to the printing head drive section 3 (step 109) and transferred to the buffer B1 (step 110). Also, data in the region IDh+2 of the main memory 2 are read, dot-expanded, and written into the variable data region in the buffer B1 (step 111). Thereafter, the buffers B1 and B2 are used alternately in the above-described manner, until the control means is ready to transfer data in the region IDp; i.e., printer has finished printing its first document.

The dot printer of the present invention may be modified so that it can operate in one of two modes, a continuous print mode and a single sheet print mode. In the continuous print mode, the printer operates as described above. In the single sheet print mode, as in the conventional printer design, the printer dot-expands printing data every several lines.

The first embodiment of the present invention can print faster than a conventional printer mainly due to two reasons. First, because there are two buffers, the printing data can be dot-expanded without any delays; that is, the printer does not need to wait for a completion of the dot-expansion of the next group of printing data each time several lines of data are printed. Second, only the variable part data of the page next to the page being printed are dot-expanded and transferred to the buffers B1 and B2 from the main memory 2; this saves time because a needless repetition of dot-expansion does not occur.

Namely, in the first example of the dot printer of the invention, the dot pattern data for one page is stored in the buffer memory, and therefore the data can be successively outputted so as to be printed out; that is, it is unnecessary for the printer to wait for the dot expansion of the next printing data with the data being printed out for every several dot lines. Therefore, the printing speed is much higher. Furthermore, in the printer, while one page of document is being printed out, the contents of the concerning one of the two buffer memories are transferred into the other buffer memory, and only the data of the variable part of the next page of document is stored in the aforementioned other buffer memory through dot expansion. Hence, the operation can be accomplished in a shorter time than in the case where one page is subjected to dot expansion in its entirety, and while one page of document is being printed out, a dot pattern for the next page of document is formed in the other buffer memory. That is, a number of pages of document the contents of which are equal to one another except only parts can be continuously printed out by using the buffer memories alternately. Thus, the dot printer of the invention is high in printing speed.

Figure 6:
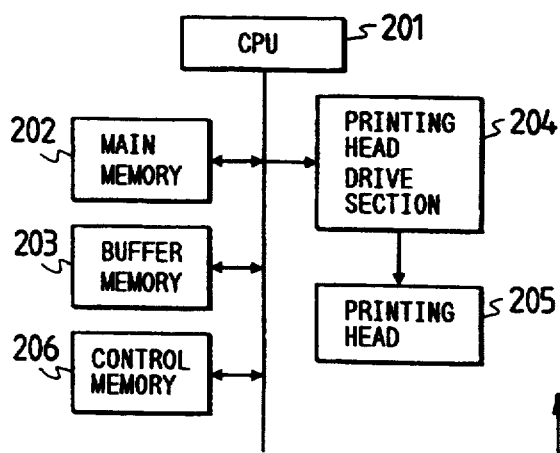
FIG. 6 is a functional block diagram of the second embodiment of the present invention.

FIG. 6 shows a second embodiment of the dot printer according to the present invention. A CPU 201 controls the printer. A main memory 202 stores printing data. A buffer 203 stores dot-pattern data to be applied to a printing head 204. The buffer 203 has a capacity to store more than one page of a document to be printed. A printing head drive section 205 controls the position and actuation of the printing head 204. A control memory 206 stores a printing program, character code pattern data, and other data needed for printing.

Figure 7:
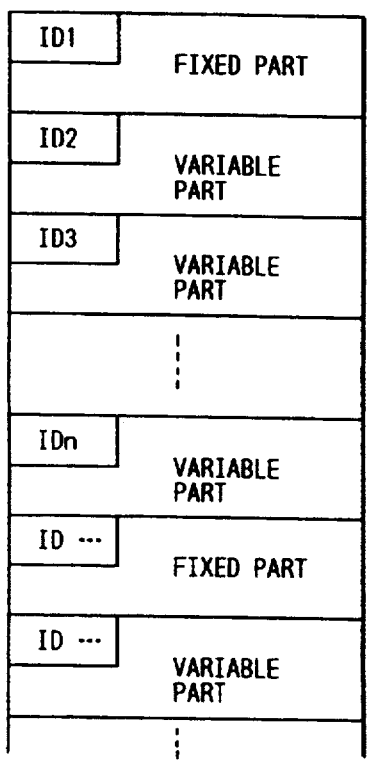
FIG. 7 shows another arrangement of the fixed part data and the variable part data in the main memory of the second embodiment.

The map of the main memory 202 is shown in FIG. 7, in which a group of fixed part data is followed by groups of variable part data. Ordering of the data groups is accomplished using ID numbers such as ID1, ID2, and so forth. For example, the group of fixed part data of document A is labelled as ID1, the groups of variable part data of the document A as IDk through IDk+n and IDx through IDx+m, and a group of fixed part data of another document as ID2. A corresponding printing instruction for the CPU 201 is "ID1 for fixed part, and IDk+3 through IDk+n, IDx and IDx+1 for variable part." In accordance with the instruction, the CPU 201 reads the group of data ID1 from the main memory 202 and converts the data into dot-pattern data, which are stored in the buffer 203. All data in the group ID1 can be stored as dot-pattern data in the buffer 203 because the buffer 203 can hold more than one page of dot-pattern data. Thereafter, the CPU 201 reads the data IDk+3 and converts them into dot-pattern data, which are to be stored in the variable data region in the buffer 203. The contents of the buffer 203 are then read and applied to the printing head drive section 204. When the page corresponding to the data ID1 and IDk+3 is printed, the CPU 201 reads the data IDk+4 and converts them into dot-pattern data, overwriting the variable data region in the buffer 203. Subsequently, the contents of the buffer 203 are applied to the printing head drive section 205 to print out the second sheet of the document. The above-described operation is repeated until the data IDx+1 is printed.

Figure 8:
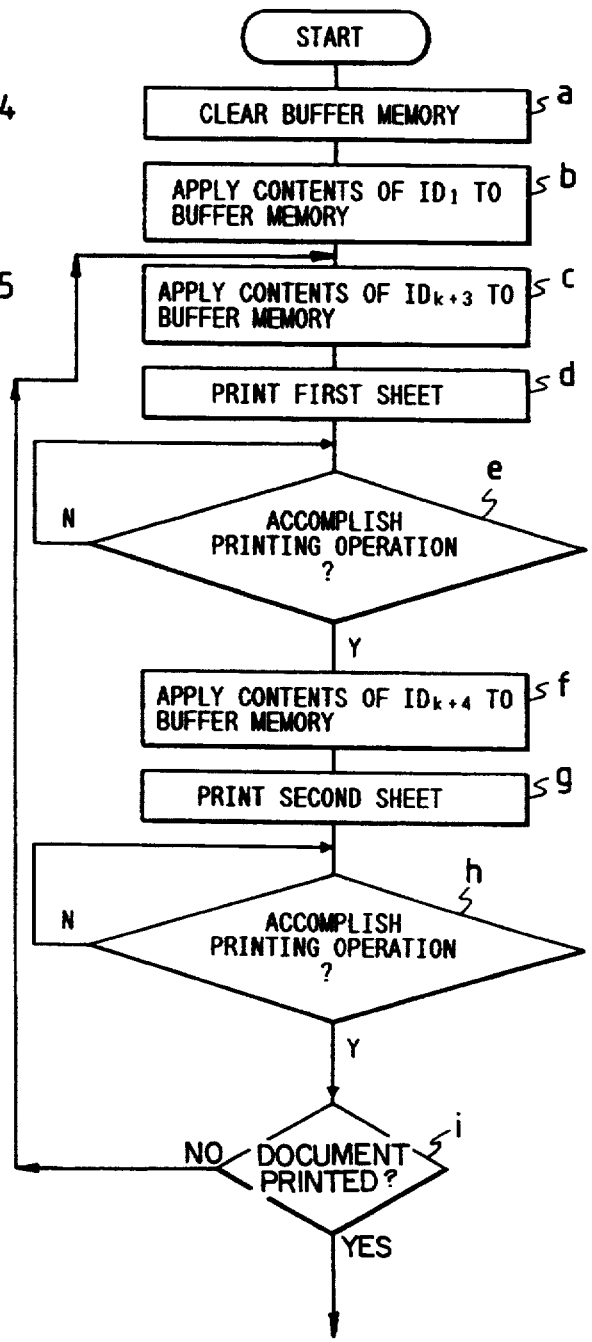
FIG. 8 is a flow chart for the operation of the second embodiment.

The above-described operation will become more apparent from FIG. 8. Upon the starting of the printing operation, the buffer 203 is reset (cleared) (step a), data ID1 is read from the main memory 202 and dot-expanded to be stored in the buffer 203 (step b). Next, data IDk+3 is read, dot-expanded, and stored in the variable part region in the buffer 203 (step c). Next, the first sheet of the document is printed out (step d). Upon completion of the printing of the first sheet (step e), the data IDk+4 is read from the main memory 202, dot-expanded, and written into the variable data region of the buffer 203 (step f). Then, the second sheet of document is printed out (step g). The data IDx+1 is read and printed out in a similar fashion.

It may be noted that, in the above-described embodiment, data related to spacing between characters or lines and the position of the first character are specified at the beginning of every group of variable part data in the main memory 202, so that overwriting dot-pattern data in the buffer 203 can begin at the first character.

In the above-described embodiment, printing instructions themselves, such as "IDn for fixed part, IDp through IDr for variable part" identify which segments of the main memory 202 may be used as fixed part data or variable part data. In other words, the CPU 201, upon reading the instruction, can determine whether the data specified by the ID number are fixed part data or variable part data. However, this scheme for allocating the main memory 202 for the fixed part data and the variable part data may be replaced by the following method: while storing data in the main memory 202, a fixed or variable part data identifying code is placed at the top. In this scheme, printing instructions mention only ID numbers. Thus, the CPU 201 can identify a group of data as either fixed or variable part data only after reading the identifying code specified in the main memory 202. Afterwards, the CPU 201 can dot-expand and write the data into the buffer 203.

The second embodiment of the present invention may be modified so that it may operate in one of two modes: a continuous print mode and a single sheet print mode. In the continuous print mode, the dot printer operates as described. In the single sheet print mode, data is dot-expanded every several lines as in conventional dot printers.

In the second embodiment of the present invention, to print the first page of a document, the whole page must be dot-expanded and transferred to the buffer. However, for the second page, third page and so forth, only the variable data region in the buffer needs to be rewritten. Therefore, in general, the printing speed of the present invention is greater than that of the conventional printer in which every page of data is subjected to dot-expansion in its entirety.

Namely, in the second example of the dot printer of the invention, in continuously printing out a number of pages of documents the contents of which are equal to one another except only parts, it takes time to store data for the first page in the buffer through dot expansion; however, for the second page, third page and so forth, only the variable part data in the buffer memory is rewritten, and therefore the printing speed is much higher than in the conventional printer in which, for every page, the data is subjected to dot expansion in its entirety. Furthermore, each page except the first page is subjected to dot expansion in its entirety in the invention, and therefore the time required for printing out a page of document is shorter than in the printing operation which is carried out with dot expansion made for every several dot lines.

In summary, the printers of the present embodiment can print faster than conventional dot printers. In the first and second embodiment of the present invention, printing one page of a document is achieved by successively applying the dot-expanded printing data to a printing head. Two buffer schemes allow dot-expanding and printing to occur simultaneously.

In addition, for a document in which the contents of each page are substantially equal to those of other pages, the dot printer of the present invention can print out the second sheet, third sheet, and so forth at a much higher speed than that of conventional dot printers, because, for the second sheet, third sheet and so on, only the variable part data are written into the buffers B1 and B2. In the conventional dot printer, all data in its main memory are dot-expanded and written into its buffer.

It will be apparent to those skilled in the art that other embodiments of the present invention may be implemented without departing from the scope of inventive concept expressed by the following claims.

What is claimed is:

1. A dot printer comprising:
   a printing head;
   a main memory for storing printing data as fixed part data and variable part data, all data in the main memory being in a code format;
   a first buffer and a second buffer for storing the printing data in a dot pattern format which is different from the code format, each buffer having a variable part region and a fixed part region;
   control means for deriving dot pattern format data from the variable part data and the fixed part data stored in main memory, for storing dot pattern format data derived from the fixed part data into the fixed part region of the first buffer just before printing, and for writing dot pattern format data derived from the variable part data into the variable part region of the second buffer or the first buffer, and for copying data in the first buffer to the second buffer and for copying data in the second buffer to the first buffer; and
   printing means for applying the dot pattern format data stored in the first buffer to a printing head while copying the dot pattern format data in the first buffer into the second buffer and writing dot pattern format data derived from a subsequent portion of the variable part data into the variable part region of the second buffer, and for applying the dot pattern format data in the second buffer to the printing head while copying the dot pattern format data in the second buffer into the first buffer and writing dot pattern format data derived from another subsequent portion of the variable part data into the variable part region of the first buffer.

2. A printing method, comprising the steps of:
   (1) reading coded data from a main memory of a printer in one page increments, where data stored in the main memory is segmented into a plurality of groups of coded variable part data and coded fixed part data;
   (2) deriving printable fixed part data from the group of coded fixed part data, and writing the printable fixed part data into a fixed part region of a buffer;
   (3) deriving printable variable part data from one group of the plurality of groups of coded variable part data, and writing the printable variable part data into a variable part region of the buffer;
   (4) applying the data in the buffer to a printing head to print out the data in the buffer; and
   (5) repeating steps (3) and (4), wherein multiple pages within a document being printed are derived from a different group of printable variable part data from the plurality of groups of coded variable part data while maintaining the same printable fixed part data, until a single document is printed out.

3. A printing method, comprising the steps of:
   (1) reading coded data from a main memory of a printer in one page increments, where data stored in main memory is segmented into a plurality of groups of coded variable part data and coded fixed part data;
   (2) deriving printable fixed part data from the group of coded fixed part data, and writing the printable fixed part data into a fixed part region of a first buffer;
   (3) deriving first printable variable part data from one group of the plurality of groups of coded variable part data, and writing the first printable variable part data into a variable part region of the first buffer;
   (4) applying the data in the first buffer to a printing head to print out the data in the first buffer while copying the data in the first buffer into a second buffer;
   (5) deriving a second printable variable part data from a subsequent one of the groups of coded variable part data, and writing the second printable variable part data into a variable part region of the second buffer;

(6) applying the data in the second buffer to the printing head to print out the data in the second buffer while copying the data in the second buffer into the first buffer; and (7) repeating steps (3) through (6), wherein multiple pages within a document being printed out are derived from different groups of printable variable part data from the plurality of groups of coded variable part data while maintaining the same printable fixed part data.

4. The dot printer as claimed in claim 1, wherein the printing data stored in the main memory includes a plurality of pages of data, the control means processes one of the pages of data at a time, and after the processed data is applied to the printing head, the next page of data is processed by the control means.

5. The dot printer as claimed in claim 4, wherein the first and second buffer each have a capacity to store more than one page of the dot pattern format of the printing data.

* * * * *